(12) United States Patent
Mathieu

(10) Patent No.: US 9,727,783 B2
(45) Date of Patent: *Aug. 8, 2017

(54) EXTENDED DEPTH-OF-FIELD BIOMETRIC SYSTEM

(71) Applicant: Global Bionic Optics Ltd, Taree, NSW (AU)

(72) Inventor: Gilles Mathieu, Peng Chau (HK)

(73) Assignee: Global Bionic Optics, LTD, Taree, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,369

(22) Filed: Oct. 12, 2016

(65) Prior Publication Data

US 2017/0032174 A1 Feb. 2, 2017

Related U.S. Application Data

(63) Continuation of application No. 14/694,545, filed on Apr. 23, 2015, now Pat. No. 9,495,590.

(51) Int. Cl.
*G06K 9/00* (2006.01)
*G02B 27/00* (2006.01)
*H04N 5/232* (2006.01)
*H04N 5/357* (2011.01)
(Continued)

(52) U.S. Cl.
CPC ....... *G06K 9/0061* (2013.01); *G02B 27/0025* (2013.01); *G02B 27/0075* (2013.01); *G06K 9/00604* (2013.01); *G06K 9/00617* (2013.01); *G06T 5/006* (2013.01);
(Continued)

(58) Field of Classification Search
CPC .......... G06K 9/00597; G06K 9/00604; G06K 9/0061; G06K 9/00617; G06T 2207/30216; H04N 1/624
See application file for complete search history.

(56) References Cited

U.S. PATENT DOCUMENTS

| 5,291,560 | A | 3/1994 | Daugman |
| 7,379,567 | B2 | 5/2008 | Azuma et al. |
| 7,486,806 | B2 | 2/2009 | Azuma et al. |

(Continued)

FOREIGN PATENT DOCUMENTS

| EP | 1978394 A1 | 8/2008 |
| WO | 2009-029638 A1 | 3/2009 |

OTHER PUBLICATIONS

J. Daugman, "High Confidence Personal Identification by Rapid Video Analysis of Iris Texture," Proceedings of the I.E.E.E. International Carnahan Conference on Security Technology, 1992.

(Continued)

*Primary Examiner* — Aaron W Carter
(74) *Attorney, Agent, or Firm* — Maynard Cooper & Gale, LLP; Joshua V. Van Hoven, Esq.

(57) ABSTRACT

An iris recognition system may include an optical system having an intentional amount of spherical aberration that results in an extended depth of field. A raw image of an iris captured by the optical system may be normalized. In some embodiments, the normalized raw image may be processed to enhance the MTF of the normalized iris image. An iris code may be generated from the normalized raw image or the enhanced normalized raw image. The iris code may be compared to known iris codes to determine if there is a match.

34 Claims, 12 Drawing Sheets

(51) Int. Cl.
*H04N 5/365* (2011.01)
*G06T 5/00* (2006.01)

(52) U.S. Cl.
CPC ......... *H04N 5/23229* (2013.01); *H04N 5/357* (2013.01); *H04N 5/365* (2013.01)

(56) References Cited

U.S. PATENT DOCUMENTS

| | | | |
|---|---|---|---|
| 8,294,764 | B2 | 10/2012 | Mathieu |
| 8,416,334 | B2 | 4/2013 | Mathieu |
| 8,488,044 | B2 | 7/2013 | Mathieu |
| 8,594,388 | B2 | 11/2013 | Mathieu |
| 9,065,993 | B1* | 6/2015 | Miao .................. G02B 3/02 |
| 9,495,590 | B1* | 11/2016 | Mathieu ............. G06K 9/00604 |
| 2006/0050409 | A1* | 3/2006 | George ............. G02B 27/0075 359/708 |
| 2006/0204861 | A1* | 9/2006 | Ben-Eliezer ....... G02B 27/0075 430/5 |
| 2006/0209292 | A1* | 9/2006 | Dowski ............... G02B 3/0056 356/121 |
| 2009/0067680 | A1* | 3/2009 | Dowski, Jr. ........... G02B 5/284 382/115 |
| 2010/0014718 | A1* | 1/2010 | Savvides ........... G06K 9/00597 382/117 |
| 2010/0110275 | A1* | 5/2010 | Mathieu .................. A61B 3/14 348/360 |
| 2010/0225759 | A1* | 9/2010 | Mathieu ............... A61B 3/1225 348/143 |
| 2010/0272327 | A1* | 10/2010 | Silveira ................. G02B 26/06 382/117 |
| 2010/0278390 | A1* | 11/2010 | Silveira ............. G06K 9/00604 382/106 |
| 2010/0302412 | A1* | 12/2010 | Hayashi ............. G02B 27/0068 348/241 |
| 2010/0328517 | A1* | 12/2010 | Mathieu ............. G02B 27/0037 348/340 |
| 2011/0075893 | A1 | 3/2011 | Connel, II et al. |
| 2011/0157551 | A1* | 6/2011 | Plamann ................ A61B 3/103 351/206 |
| 2011/0261247 | A1* | 10/2011 | Mathieu ............. G02B 13/0025 348/340 |
| 2012/0275665 | A1 | 11/2012 | Bergen et al. |
| 2012/0307133 | A1* | 12/2012 | Gao ................... G02B 27/0075 348/349 |
| 2014/0313306 | A1* | 10/2014 | Venkatesha ........ G06K 9/00604 348/78 |
| 2016/0117544 | A1* | 4/2016 | Hoyos ................ H04N 5/23219 348/78 |
| 2016/0314350 | A1* | 10/2016 | Mathieu ............. G06K 9/00604 |
| 2017/0032174 | A1* | 2/2017 | Mathieu ............. G06K 9/00604 |

OTHER PUBLICATIONS

Wang, et al., "Iris Recognition Based on Multichannel Gabor Filtering," ACCV2002: The 5th Asian Conference on Computer Vision, Jan. 2002.

Nithyanandam, et al., "A New IRIS Normalization Process for Recognition System with Cryptographic Techniques," IJCSI International Journal of Computer Science Issues, vol. 8, Issue 4, Jul. 2011.

Balas, et al., "Combined Haar-Hilbert and Log-Gabor Based Iris Encoders," http://www.academia.edu/2886889/Combined_Haar-Hilbert_and_Log-Gabor_Based_iris_Encoders, Feb. 2012.

Shirke, et al., "IRIS Recognition Using Gabor," Int.J.Computer Technology & Applications, vol. 4 (1),1-7, http://www.ijcta.com/documents/volumes/vol4issue1/ijcta2013040101.pdf, Jan.-Feb. 2013.

Sathiyaraja, et al., "Iris Segmentation and Recognition Using Log Gabor Filter and Curvelet Transform," International Journal of Engineering and Computer Science, vol. 2, Issue 9, Sep. 2013.

\* cited by examiner

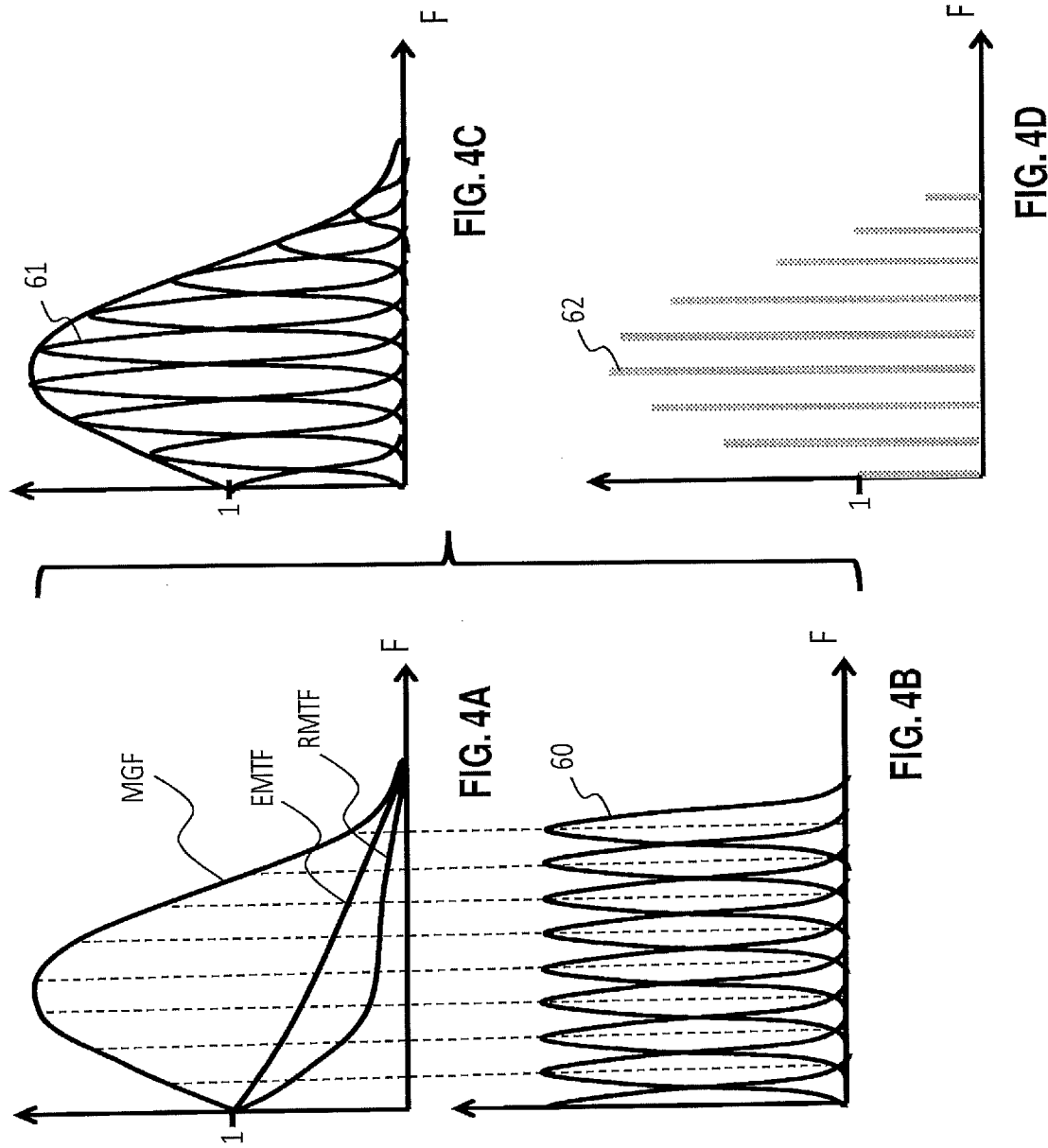

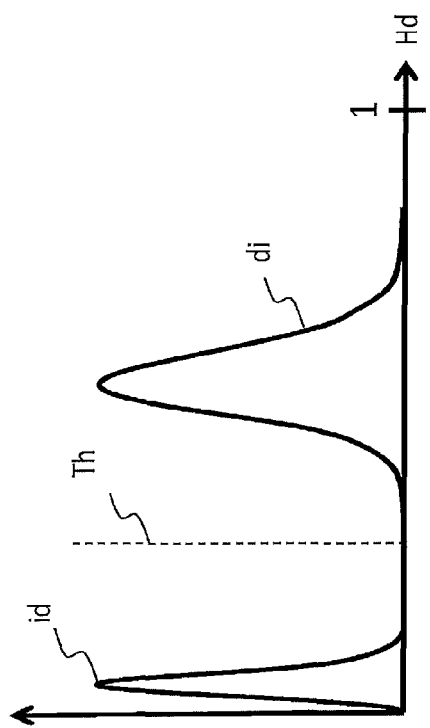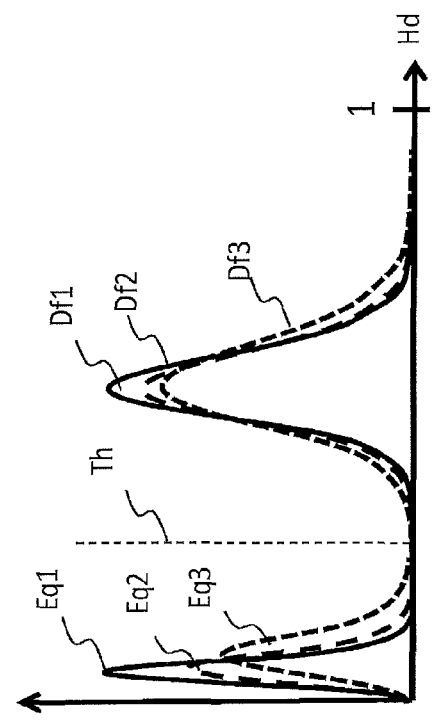

EXTENDED DEPTH-OF-FIELD BIOMETRIC SYSTEM

CROSS REFERENCE TO RELATED APPLICATION

The application is a continuation of and claims priority to U.S. application Ser. No. 14/694,545, entitled "EXTENDED DEPTH-OF-FIELD BIOMETRIC SYSTEM," filed on Apr. 23, 2015, which is incorporated herein by reference in its entirety.

FIELD OF THE INVENTION

The subject disclosure is directed to a biometric identification system having an extended depth-of-field optical system with a designed level of spherical aberration.

BACKGROUND OF THE INVENTION

Biometric systems such as iris recognition systems may capture an image of a feature of a person having unique characteristics (e.g., an iris) for various purposes, for example, to confirm the identity of the person based on the captured image. In the example of iris recognition, an original high-quality image of the iris of a person may be captured by an optical system and converted into an iris code which is stored in a database of iris codes associated with a group of people. In order to later confirm the identity of a user, an image of the user's iris is captured, an iris code is generated, and the iris code for the captured iris image is compared to iris codes stored in the database. If the iris code of the captured iris image exhibits a significant level of similarity with a stored iris code (e.g., the Hamming distance between the captured and stored image is less than a threshold), it can be assumed that the iris of the user is a match with the identity associated with the stored iris code.

Iris recognition systems may have difficulty capturing iris images of a sufficient quality for use in this matching procedure. For example, if a person is moving it may be difficult to capture a high-quality image of the iris. Even if a person is stationary, many optical systems require precise positioning of the iris relative to the optical system as a result of the limited depth of field or focus of the optical system.

An extended depth-of-field (EDOF) (also known as extended depth-of-focus) optical system may permit more flexibility in capturing a desired image, since the optical system can capture images having a relatively high quality over a larger distance from the optical system, with some sacrifice in the modulation transfer function (MTF) of the captured image. EDOF optical systems may include complicated optical systems, for example, including either more than one lens element or a non-circularly symmetric wavefront coding plate arranged in the entrance pupil to impart a complex wavefront shape.

EDOF optical systems used in biometrics such as iris recognition may digitally enhance captured raw images to compensate for the reduced MTF of images captured with the EDOF optical system. This additional layer of processing may consume a large amount of consuming resources, take an extended period of time, or both. This may result in excessive costs for a biometrics system utilizing EDOF technology, or may compromise the performance of biometrics systems which need to quickly process and compare biometric features with stored images (e.g., compare an iris code from a captured image iris image with a database of stored iris codes).

The above-described deficiencies of today's biometric solutions are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY OF THE INVENTION

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various embodiments, a method of processing an extended depth-of-field (EDOF) image of an iris at an imaging wavelength λIM comprises capturing a raw image of the iris, wherein the raw image has a reduced modulation transfer function (MTF) based on an optical system having an amount of spherical aberration (SA) of 0.2 λIM<SA<2 λIM. The method also comprises normalizing the raw image. The method further comprises generating an iris code based on the normalized raw image.

In various embodiments, a system for processing an extended depth-of-field (EDOF) image of an iris at an imaging wavelength $2_{IM}$, may comprise an optical system having an amount of spherical aberration (SA) of $0.2\lambda_{IM} \leq SA \leq 2\lambda_{IM}$, the optical system being configured to form on an image sensor a raw image having reduced a modulation transfer function (MTF) based on the spherical aberration. The system may also comprise a controller electrically connected to the image sensor, wherein the controller is configured to capture a raw image of the iris, normalize the raw image, and generate an iris code based on the normalized raw image.

In addition, various other modifications, alternative embodiments, advantages of the disclosed subject matter, and improvements over conventional monitoring units are described. These and other additional features of the disclosed subject matter are described in more detail below.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 4A depicts an exemplary plot of raw MTF, enhanced MTF, and MTF gain function as a function of spatial frequency in accordance with some embodiments of the present disclosure;

FIG. 4B depicts an exemplary plot of base wavelet functions for generating an iris code represented as a function of spatial frequency in accordance with some embodiments of the present disclosure;

FIG. 4C depicts an exemplary plot of the base wavelet functions for generating an iris code modulated by the gain MTF function, as a function of spatial frequency, in accordance with some embodiments of the present disclosure;

FIG. 4D depicts an exemplary plot of a discrete representation of gain coefficients associated with the modulated wavelet functions of FIG. 4C, as a function of spatial frequency, in accordance with some embodiments of the present disclosure;

FIG. 9A depicts an exemplary Hamming distance distribution for comparison of iris codes in accordance with some embodiments of the present disclosure;

FIG. 9B depicts exemplary Hamming distance distributions for comparison of iris codes in accordance with some embodiments of the present disclosure.

DETAILED DESCRIPTION OF ILLUSTRATIVE EMBODIMENTS

Figure 1:
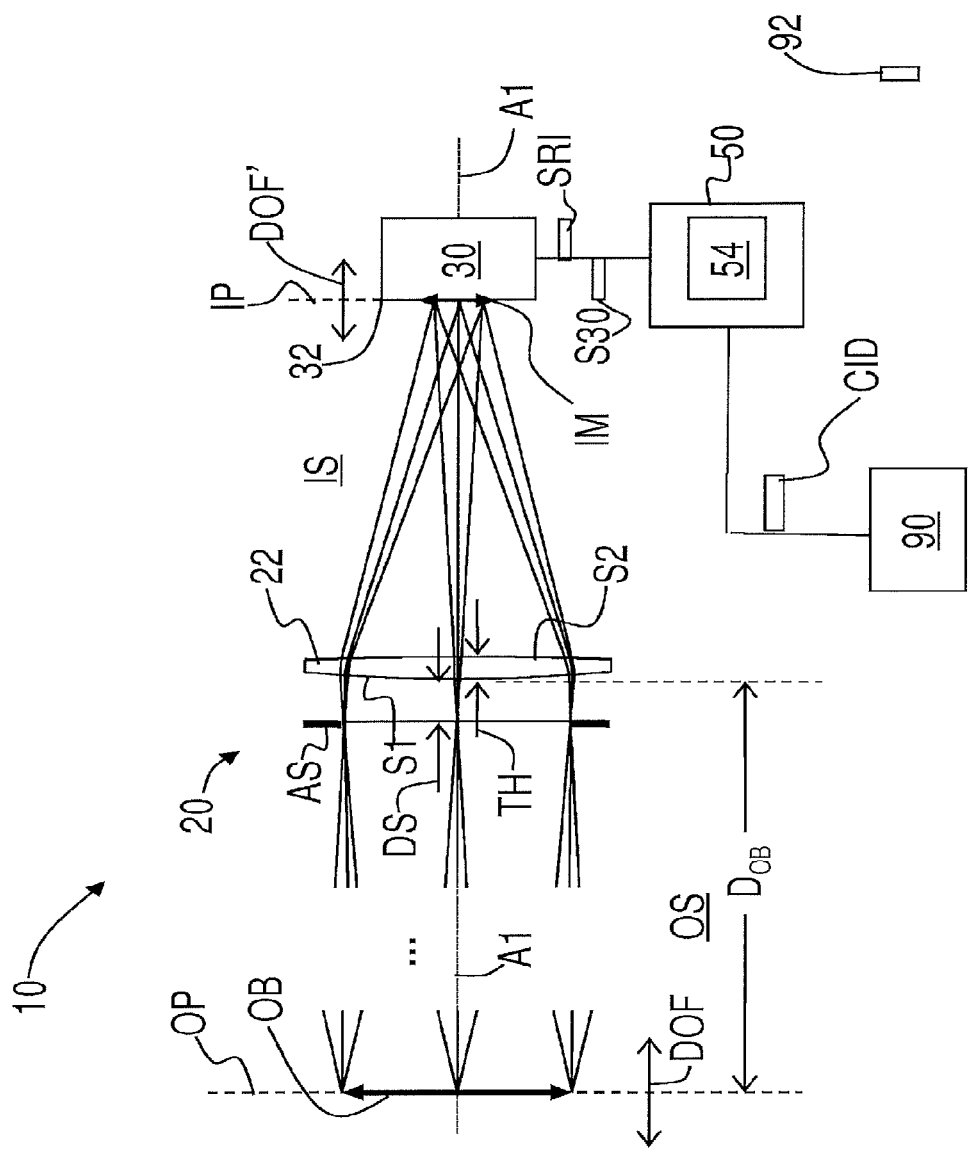
FIG. 1 depicts an exemplary system diagram of a system for image acquisition, processing, and identification in accordance with some embodiments of the present disclosure.

Exemplary biometric systems such as iris recognitions systems are described herein for the purposes of illustration and not limitation. For example, one skilled in the art can appreciate that the illustrative embodiments can have application with respect to other biometric systems and to other recognition applications such as industrial automation systems.

Reference is now made in detail to the present exemplary embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the exemplary embodiments may be omitted, modified, or combined in different ways to achieve yet further embodiments. Accordingly, the true scope of the invention is to be understood from the entirety of the present disclosure, in view of but not limited to the embodiments described herein.

Embodiments of the present disclosure describe systems and methods of acquiring iris images with an EDOF optical systems, such as a single-lens EDOF system. The single-lens EDOF optical systems may use a lens presenting a controlled amount of spherical aberration, for example, as described in PCT Patent Application PCT/IB2008/001304, filed on Feb. 29, 2008, which is incorporated herein by reference. The captured iris image may be processed to integrate characteristics of the optical transfer function (OTF) that can be reduced by the symmetrical revolute MTF (Modulation Transfer Function). An iris code produced from the captured image may be compared to stored iris codes. The systems and methods described herein may be implemented by any suitable hardware and/or software implementation for use in any suitable device that can capture and process images, such as security systems, tablet computers, cell phones, smart phones, computers, cameras, mobile iris recognition devices, restricted-entry devices, CCTV systems, appliances, vehicles, weapons systems, any other suitable device, or any combination thereof. Moreover, it will be understood that an EDOF system and biometric comparison system may be used for other biometric applications (e.g., facial recognition, touchless fingerprint) as well as other capture and recognition systems, for example, in industrial applications.

A generalized single-lens EDOF optical system is first discussed, followed by exemplary embodiments of single-lens imaging optical systems for use in the generalized EDOF optical system. This disclosure will then address an iris recognition system including an EDOF optical system.

Generalized EDOF System

FIG. 1 is a block diagram of an exemplary embodiment of a single-lens EDOF optical system ("system") 10 in accordance with the present disclosure. System 10 includes an optical axis A1 along which is arranged an imaging optical system 20 that consists of a single lens element 22 and an aperture stop AS located objectwise of the lens element at an axial distance DS from an objectwise front lens surface S1. Aperture stop AS is "clear" or "open," meaning that it does not include any phase-altering elements, such as phase plates, phase-encoding optical elements or other types of phase-altering means. Although any suitable single-lens optical system may be used in accordance with the present disclosure, in an embodiment, the single-lens optical system may be configured as is described in U.S. Pat. No. 8,594,388, which is incorporated herein by reference. Such a single-lens optical system may include an aperture stop that is located at a position that minimizes comatic aberration, and may be constructed of any suitable materials, such as glass or plastic. In some embodiments, the single lens may be a single, rotationally symmetric optical component made of a single optical material, for example, as is described in U.S. Pat. No. 8,416,334, which is incorporated by reference herein. In some embodiments, the single lens may include a spherical refractive surface, for example, as is described in U.S. Pat. No. 8,488,044, which is incorporated by reference herein, or PCT Application No. PCT/IB2008/001304, filed on Feb. 29, 2008, which is incorporated by reference herein.

Optical system 20 has a lateral magnification $M_L$, an axial magnification $MA=(M_L)^2$, an object plane OP in an object space OS and an image plane IP in an image space IS. An object OB is shown in object plane OP and the corresponding image IM formed by optical system 20 is shown in image plane IP. Object OB is at an axial object distance $D_{OB}$ from lens element 22.

Optical system 20 has a depth of field DOF in object space OS over which the object OB can be imaged and remain in focus. Likewise, optical system 20 has a corresponding depth of focus DOF' in image space IS over which image IM of object OB remains in focus. Object and image planes OP and IP are thus idealizations of the respective positions of object OB and the corresponding image IM and typically correspond to an optimum object position and a "best focus" position, respectively. In actuality, these planes can actually fall anywhere within their respective depth of field DOF and depth of focus DOF', and are typically curved rather than planar. The depth of field DOF and depth of focus DOF' are defined by the properties of optical system 20, and their interrelationship and importance in system 10 is discussed more fully below.

System 10 also includes an image sensor 30 that has a photosensitive surface 32 (e.g., an array of charge-coupled devices) arranged at image plane IP so as receive and detect image IM, which is also referred to herein as an "initial" or a "raw" image. Although any suitable image sensor 30 may be used in accordance with the present disclosure, in an exemplary embodiment image sensor 30 may be or include a high-definition CCD camera or CMOS camera. In an exemplary embodiment, photosensitive surface 32 is made up of 3000×2208 pixels, with a pixel size of 3.5 microns. The full-well capacity is reduced to 21,000 electrons for a CMOS camera at this small pixel size, which translates into a minimum of shot noise of 43.2 dB at saturation level. An example image sensor 30 is or includes a camera from Pixelink PL-A781 having 3000×2208 pixels linked by IEEE1394 Fire Wire to an image processor (discussed below), and the application calls API provided by a Pixelink library in a DLL to control the camera perform image acquisition. An example image sensor 30 has about a 6 mm diagonal measurement of photosensitive surface 32.

In an exemplary embodiment, system 10 further includes a controller 50, such as a computer or like machine, that is adapted (e.g., via instructions such as software embodied in a computer-readable or machine-readable medium) to control the operation of the various components of the system. Controller 50 is configured to control the operation of system 10 and includes an image processing unit ("image processor") 54 electrically connected to image sensor 30 and adapted to receive and process digitized raw image signals SRI therefrom and form processed image signals SPI, as described in greater detail below.

Figure 2:
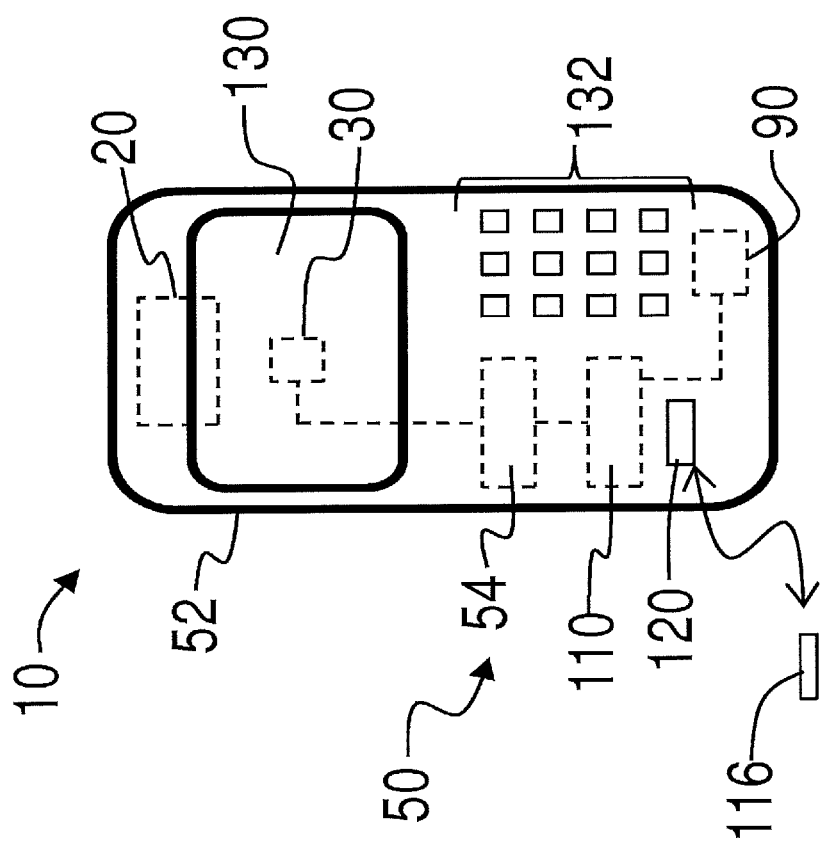
FIG. 2 depicts an exemplary biometric device in accordance with some embodiments of the present disclosure.

FIG. 2 is a schematic diagram of an exemplary hand-held device 52 that includes system 10, in accordance with some embodiments of the present disclosure. In an exemplary embodiment, controller 50 is or includes a computer with a processor (e.g., image processor 54) and includes an operating system such as Microsoft WINDOWS or LINUX.

In an exemplary embodiment, image processor 54 may be or include any suitable processor having processing capability necessary to perform the processing functions described herein, including but not limited to hardware logic, computer readable instructions running on a processor, or any combination thereof. In some embodiments, the processor may include a general- or special-purpose microprocessor, finite state machine, controller, computer, central-processing unit (CPU), field-programmable gate array (FPGA), or digital signal processor. In an exemplary embodiment, the processor is an Intel I7, XEON or PENTIUM processor, or an AMD TURION or other processor in the line of such processors made by AMD Corp., Intel Corp., or other semiconductor processor manufacturers. Image processor 54 may run software to perform the operations described herein, including software accessed in machine readable form on a tangible non-transitory computer readable storage medium, as well as software that describes the configuration of hardware such as hardware description language (HDL) software used for designing chips.

Controller 50 may also include a memory unit ("memory") 110 operably coupled to image processor 54, on which may be stored a series of instructions executable by image processor 54. As used herein, the term "memory" refers to any tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, flash memory, CD-ROM, DVD, disks or optical storage, magnetic storage, or any other non-transitory medium that stores information that is accessed by a processor or computing device. In an exemplary embodiment, controller 50 may include a port or drive 120 adapted to accommodate a removable processor-readable medium 116, such as CD-ROM, DVD, memory stick or like storage medium.

The EDOF methods of the present disclosure may be implemented in various embodiments in a machine-readable medium (e.g., memory 110) comprising machine readable instructions (e.g., computer programs and/or software modules) for causing controller 50 to perform the methods and the controlling operations for operating system 10. In an exemplary embodiment, the computer programs run on image processor 54 out of memory 110, and may be transferred to main memory from permanent storage via disk drive or port 120 when stored on removable media 116, or via a wired or wireless network connection when stored outside of controller 50, or via other types of computer or machine-readable media from which it can be read and utilized.

The computer programs and/or software modules may comprise multiple modules or objects to perform the various methods of the present disclosure, and control the operation and function of the various components in system 10. The type of computer programming languages used for the code may vary between procedural code-type languages to object-oriented languages. The files or objects need not have a one to one correspondence to the modules or method steps described depending on the desires of the programmer. Further, the method and apparatus may comprise combinations of software, hardware and firmware. Firmware can be downloaded into image processor 54 for implementing the various exemplary embodiments of the disclosure.

Controller 50 may also include a display 130, which may be any suitable display for displaying information in any suitable manner, for example, using a wide variety of alphanumeric and graphical representations. In some embodiments, display 130 may display enhanced images (e.g., images captured and enhanced by system 10). Controller 50 may also include a data-entry device 132. Data entry device 132 may include any suitable device that allows a user of system 10 to interact with controller 50. For example, a keyboard or touchscreen may allow a user to input information for controller 50 (e.g., the name of the object being imaged, etc.) and to manually control the operation of system 10. In an exemplary embodiment, controller 50 is made sufficiently compact to fit within a small form-factor housing of a handheld or portable device, such as device 52 shown in FIG. 2.

System 10 may also include a database unit 90 operably connected to controller 50. In an embodiment, database unit 90 may include memory unit 92 that serves as a computer-readable medium adapted to receive processed image signals SPI from image processor 54 and store the associated processed digital images of object OB as represented by the processed image signals. Memory unit 92 may include any suitable memory as described herein, and may be operably connected to controller 50 in any suitable manner (e.g., locally within system 10 or remotely). In an exemplary embodiment, database unit 90 is included within controller 50.

General Method of Operation

With reference to FIG. 1, in the general operation of system 10, image IM of object OB is formed on photosensitive surface 32 of sensor 30 by optical system 20. Controller 50 sends a control signal S30 to activate image sensor 30 for a given exposure time so that image IM is captured by photosensitive surface 32. Image sensor 30 digitizes this "raw" image IM and creates the electronic raw image signal SRI representative of the raw captured image.

Image processor 54 may be adapted to receive from image sensor 30 digitized electrical raw image signals SRI and collect the corresponding raw images to be stored in compressed format. The data format can follow usual standards such as ISO INCITS 379 and ISO 19794-6. The images can be stored as native or compressed images (TIFF, bmp, jpeg). In some embodiments, the raw images may be processed further, with the processed version(s) of the image being stored instead of or in addition to the raw image. For example, as described herein, in some embodiments the raw image may be enhanced to improve the captured MTF (e.g., for images captured by a system having EDOF optics). In some embodiments such as iris recognition, the images can be processed further to be normalized and/or to generate a compressed iris code that is specifically stored in a highly compressed format that represents the iris pattern only.

In some embodiments, the raw image IM can be used directly, i.e., without any processing to enhance the image, or with only minor image processing that does not involve MTF-enhancement, as discussed below. This approach can be used for certain types of imaging applications, such as character recognition and for imaging binary objects (e.g., bar-code objects) where, for example, determining edge location is more important than image contrast. The raw image IM is associated with an EDOF provided by optical system 20 even without additional contrast-enhancing image processing, so that in some exemplary embodiments, system 10 need not utilize some or all of the image-processing capabilities of the system. In some embodiments, as described herein, some aspects of processing for iris recognition may be omitted for images captured with an EDOF system and processed.

In an embodiment, a number N of raw images are collected and averaged (e.g., using image processor 54) in order to form a (digitized) raw image IM' that has reduced noise as compared to any one of the N raw images.

In some embodiments, it may be desired enhance the raw image IM. Image processor 54 may receive and digitally process the electronic raw image signal SRI to form a corresponding contrast-enhanced image embodied in an electronic processed image signal SPI, which is optionally stored in database unit 90.

In some embodiments such as biometric applications, system 10 may compare captured biometric information (e.g., iris codes associated with a captured iris image and stored in database 90) with known biometric information (e.g., iris codes associated with known users and stored in database 90 or remotely). Controller 50 may access the stored processed images or related data (e.g., iris codes) from database unit 90 for comparison, as described herein. In an exemplary embodiment of iris recognition, compressed data from normalized iris images may be used for comparison. In some embodiments, this high end compressed data can fit in small files or data block of 5 kB to 10 kB.

Optical System

As discussed above, imaging optical system 20 has a depth of field DOF in object space OS and a depth of focus DOF' in image space IS as defined by the particular design of the optical system. The depth of field DOF and the depth of focus DOF' for conventional optical systems can be ascertained by measuring the evolution of the Point Spread Function (PSF) through focus, and can be established by specifying an amount of loss in resolution R that is deemed acceptable for a given application. The "circle of least confusion" is often taken as the parameter that defines the limit of the depth of focus DOF'.

In the present disclosure, both the depth of field DOF and the depth of focus DOF' are extended by providing optical system 20 with an amount of spherical aberration (SA). In an exemplary embodiment, $0.2\lambda \le SA \le 5\lambda$, more preferably $0.2\lambda \le SA \le 2\lambda$, and even more preferably $0.5\lambda \le SA \le 1\lambda$, where $\lambda$, is an imaging wavelength. In an exemplary embodiment, the amount of spherical aberration SA in the optical system at the imaging wavelength 2, is such that the depth of field DOF or the depth of focus DOF' increases by an amount between 50% and 500% as compared to a diffraction limited optical system. By adding select amounts of spherical aberration SA, the amount of increase in the depth of field DOF can be controlled. The example optical system designs set forth herein add select amounts of spherical aberration SA to increase the depth of field DOF without substantially increasing the adverse impact of other aberrations on image formation.

Since the depth of field DOF and the depth of focus DOF' are related by the axial magnification $M_A$ and lateral magnification $M_L$ of optical system 20 via the relationships $DOF'=(M_A) DOF=(M_L)^2 DOF$, system 10 is said to have an "extended depth of field" for the sake of convenience. One skilled in the art will recognize that this expression also implies that system 10 has an "extended depth of focus" as well. Thus, either the depth of field DOF or the depth of focus DOF' is referred to below, depending on the context of the discussion.

The MTF can also be used in conjunction with the PSF to characterize the depth of focus DOF' by examining the resolution R and image contrast CI of the image through focus. Here, the image contrast is given by $$CI=(I_{MAX}-I_{MIN})/(I_{MAX}+I_{MIN})$$

and is measured for an image of a set of sinusoidal line-space pairs having a particular spatial frequency, where $I_{MAX}$ and $I_{MIN}$ are the maximum and minimum image intensities, respectively. The "best focus" is defined as the image position where the MTF is maximized and where the PSF is the narrowest. When an optical system is free from aberrations (i.e., is diffraction limited), the best focus based on the MTF coincides with the best focus based on the PSF. However, when aberrations are present in an optical system, the best focus positions based on the MTF and PSF can differ.

Conventional lens design principles call for designing an optical system in a manner that seeks to eliminate all aberrations, or to at least balance them to minimize their effect so that the optical system on the whole is substantially free of aberrations. However, in the present disclosure, optical system 20 is intentionally designed to have spherical aberration as a dominant aberration, and may also have a small amount of chromatic aberration as well.

The spherical aberration reduces the contrast of the image by reducing the overall level of the MTF from the base frequency $f_o=0$ to the cutoff frequency fc. The cut off frequency $f_c$ is not significantly reduced as compared to the ideal (i.e., diffraction-limited) MTF, so nearly all the original spatial-frequency spectrum is available. Thus, the spatial-frequency information is still available in the image, albeit with a lower contrast. In some embodiments, the reduced contrast may be restored by the MTF enhancement digital filtering process as carried out by image processing unit 54, as described below. In some embodiments, it may not be necessary to perform the MTF enhancement, i.e., an EDOF image with a reduced MTF may be used without MTF enhancement, for example, in some embodiments of iris recognition as described herein.

The amount of spherical aberration SA increases the depth of focus DOF' in the sense that the high spatial frequencies stay available over a greater range of defocus. The processing of the image described herein permits the image to be used for applications such as biometrics (e.g., with or without digital filtering that restores the contrast over the enhanced depth of focus DOF'), thereby effectively enhancing the imaging performance of optical system 20.

Spherical aberration is an "even" aberration in the sense that the wavefront "error" is an even power of the normalized pupil coordinate p. Thus, spherical aberration presents a rotationally symmetric wavefront so that the phase is zero. This means that the resulting Optical Transfer Function (OTF) (which is the Fourier Transform of the PSF) is a rotationally symmetric, real function. The MTF, which is the magnitude of the OTF, can be obtained where spherical aberration is the dominant aberration by considering a one-dimensional MTF measurement taken on a slanted edge. This measurement provides all the required information to restore the two-dimensional image via digital signal processing. Also, the phase is zero at any defocus position, which allows for digital image processing to enhance the MTF without the need to consider the phase component (i.e., the phase transfer function, or PFT) of the OTF in the Fourier (i.e., spatial-frequency) space.

An amount of spherical aberration SA of about $0.752\lambda$, gives a significant DOF enhancement without forming a zero in the MTF on one defocus side. Beyond about $SA=0.752\lambda$, a zero occurs on both sides of defocus from the best focus position. For a diffraction-limited optical system, the depth of focus DOF' is given by the relationship $DOF'=\pm\lambda/(NA^2)$, where NA is the numerical aperture of the optical system. In an exemplary embodiment, optical system 20 has an NA between about 0.033 and 0.125 (i.e., about F/15 to about F/4, where F/#=1/(2NA) assuming the small-angle approximation).

By way of example, for F/6.6, a center wavelength of $\lambda_c=800$ nm and a bandwidth of $\Delta\lambda$, the diffraction-limited depth of focus DOF' is about 20 mm, with a transverse magnification of 1/1.4. The introduction of an amount of spherical aberration $SA=0.75\lambda$, increases the depth of focus DOF' to about 100 mm, an increase of about 5×.

MTF Enhancement

In some embodiments, it may be desired to improve the contrast of a raw image captured with an EDOF system having spherical aberration. In some embodiments, this may be accomplished by filtering the raw images in a manner that restores the MTF as a smooth function that decreases continuously with spatial frequency and that preferably avoids overshoots, ringing and other image artifacts.

Noise amplification is often a problem in any filtering process that seeks to sharpen a signal (e.g., enhance contrast in a digital optical image). Accordingly, in an exemplary embodiment, an optimized gain function (similar to Wiener's filter) that takes in account the power spectrum of noise is applied to reduce noise amplification during the contrast-enhancement process.

In an exemplary embodiment, the gain function applied to the "raw" MTF to form the "output" or "enhanced" MTF (referred to herein as "output MTF") depends on the object distance DOB. The MTF versus distance DOB is acquired by a calibration process wherein the MTF is measured in the expected depth of field DOF by sampling using defocus steps $\delta_F \leq (1/8)(\lambda/(NA^2))$ to avoid any undersampling and thus the loss of through-focus information for the MTF. In this instance, the enhanced MTF is said to be "focus-dependent."

In an embodiment, the MTF gain function may not depend on the object distance. Although an MTF gain function may be determined in any suitable manner, in an embodiment the MTF gain function may be estimated based on the ratio of an enhanced MTF target function over the average of the raw MTF within the allocated depth of field. For example, because the typical smooth shape of a desired MTF compared to the MTF of an image acquired by a system having spherical aberration may be known, an approximation may be sufficiently accurate for MTF enhancement.

The above-mentioned MTF gain function used to restore or enhance the raw MTF is a three-dimensional function G(u, v, d), wherein u is the spatial frequency along the X axis, v is the spatial frequency along the Y axis, and d is the distance of the object in the allowed extended depth of field DOF (d thus corresponds to the object distance $D_{OB}$). The rotational symmetry of the PSF and MTF results in a simplified definition of the gain function, namely:

$$G'(\omega,d) \text{ with } \omega^2=u^2+v^2$$

The rotational symmetry also makes G'(□, d) a real function instead of a complex function in the general case.

The "enhanced" or "restored" OTF is denoted OTF' and is defined as:

$$OTF'(u,v,d)=G(u,v,d)OTF(u,v,d)$$

where OTF is the Optical Transfer Function of the optical system for incoherent light, OTF' is the equivalent OTF of the optical system including the digital processing, and G is the aforementioned MTF gain function. The relationship for the restored or "output" or "enhanced" MTF (i.e., MTF') based on the original or unrestored MTF is given by:

$$MTF'(\omega,d)=G'(\omega,d)MTF(\omega,d)$$

When the object distance is unknown, an optimized average gain function G' can be used. The resulting MTF is enhanced, but is not a function of the object distance.

The after-digital process may be optimized to deliver substantially the same MTF at any distance in the range of the working depth of field DOF. This provides a substantially constant image quality, independent of object distance DOB, so long as DOB is within the depth of field DOF of optical system 20. Because optical system 20 has an extended depth of field DOF due to the presence of spherical aberration as described below, system 10 can accommodate a relatively large variation in object distance DOB and still be able to capture suitable images.

FIG. 4A depicts an exemplary plot of raw MTF, enhanced MTF, and MTF gain function as a function of spatial frequency in accordance with some embodiments of the present disclosure. In an embodiment, these plots may provide an exemplary gain function and their corresponding polychromatic processed (output) EMTF obtained using the above-described process. The MTF gain function MGF may be simplified as a frequency function composed of the product of a parabolic function multiplied by a hypergaussian function, namely:

$$\text{Gain} = (1 + A \cdot f^2) \cdot e^{-\left(\frac{f^2}{f_0^2}\right)^n}$$

Here, A is a constant, n is the hypergaussian order, and $f_o$ is the cutoff frequency, which is set at the highest frequency where the raw MTF is recommended to be higher than 5% on the whole range of the extended depth of field DOF. The parameters A, $f_o$ and n allow for changing the output MTF' level and managing the cut off frequency depending on the Nyquist frequency $f_N$ of the image sensor. Reducing the MTF at the Nyquist frequency $f_N$ reduces the noise level and avoids aliasing artifacts in the image.

Although it will be understood that the MGF may be implemented in any suitable manner, for example, based on the methodology used to obtain the MGF, in an embodiment one efficient methodology of implementing the MGF may be as a sampled table of calibrated data that may be stored in memory of system 10.

Figure 6A:
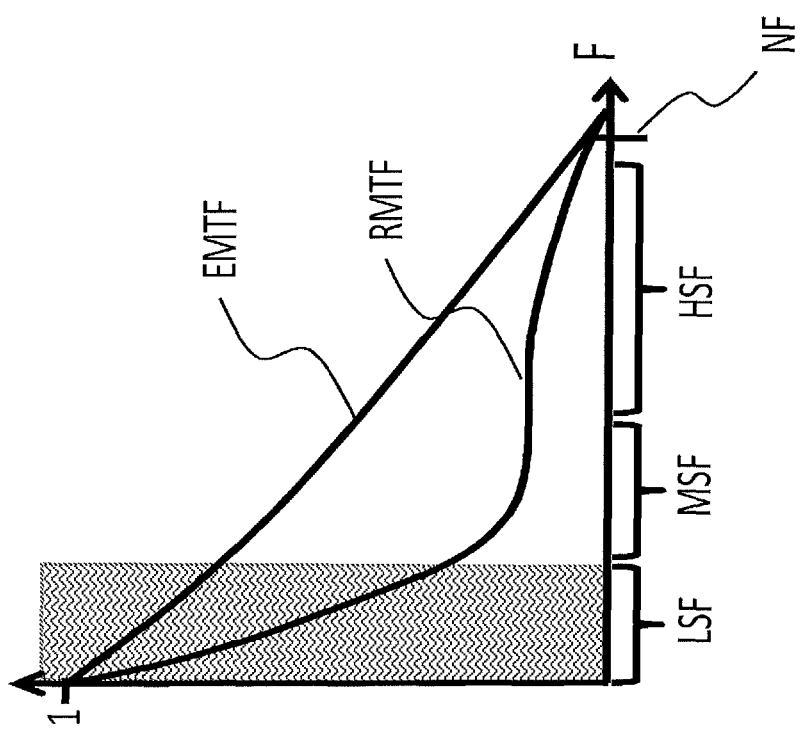
FIG. 6A depicts an exemplary plot of the raw and enhanced MTF produced by an EDOF optical system with a lens having spherical aberration, at different spatial frequency ranges, in accordance with some embodiments of the present disclosure.
Figure 6B:
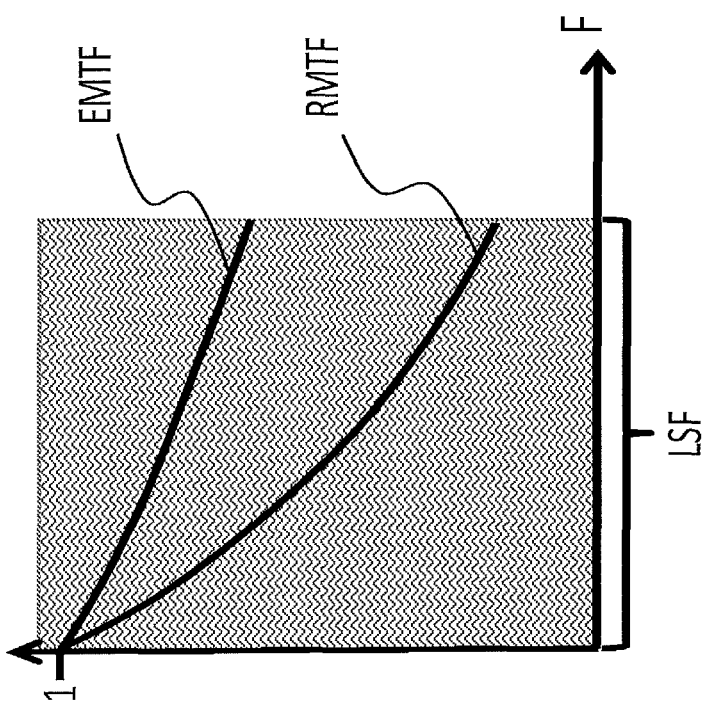
FIG. 6B depicts an exemplary plot of the raw and enhanced MTF produced by an EDOF optical system with a lens having spherical aberration, at the low spatial frequency range of FIG. 6A, in accordance with some embodiments of the present disclosure.

FIG. 6A depicts an exemplary plot of the raw and enhanced MTF produced by an EDOF optical system with a lens having spherical aberration, at different spatial frequency ranges, in accordance with some embodiments of the present disclosure, while FIG. 6B depicts an exemplary plot of the raw and enhanced MTF produced by an EDOF optical system with a lens having spherical aberration, at the low spatial frequency range of FIG. 6A, in accordance with some embodiments of the present disclosure. In FIG. 6A, the shape of the output MTF' is as close as possible to the hypergaussian function, namely:

$$\text{Gain}(f) = \frac{e^{-\left(\frac{f^2}{f_0^2}\right)^n}}{MTF_{z=0}(f)}$$

In this way, the gain function is adapted to produce the hypergaussian output MTF' as described after digital processing. The raw MTF multiplied by the gain function produces the hypergaussian output MTF'.

The output MTF' may be represented by a hypergaussian output function. The hypergaussian output MTF' has some valuable properties of producing a high contrast at low and medium spatial frequencies up to the half cut off frequency, and may produce a continuous and regular drop that minimizes overshoot and ringing on the processed PSF, LSF (Line Spread Function) and ESF (Edge Spread Function).

If n=1, the output MTF' is Gaussian. This provides a PSF, LSF and ESF without any ringing or overshoot. If n>1, the output MTF' is hypergaussian. For higher values of n, the contrast at high spatial frequencies is also high, but ringing and overshoot increases. In some embodiments, a good compromise may be 1>n>2, wherein the output MTF' is well enhanced at low and medium spatial frequencies, while the ringing and overshoot are limited to about 5%, which may be acceptable for most imaging applications. In an exemplary embodiment, the real output MTF' is as close as possible to a hypergaussian.

In some embodiments, it may be desirable to control the power noise amplification. At distances where the gain on the raw MTF is higher in order to achieve the output MTF', a good compromise between the MTF level and the signal-to-noise ratio on the image can be determined, while controlling the slope of the output MTF' at high special frequencies may avoid significant overshoot.

In the MTF plots of FIG. 4A, the output MTF "EMTF" has a smooth shape that avoids overshoots and other imaging artifacts. The applied gain of the digital filter is optimized or enhanced to obtain the maximum output MTF' while controlling the gain or noise.

Image Noise Reduction by Averaging Sequential Images

There are two distinct sources of noise associated with the image acquisition and image processing steps. The first source of noise is called "fixed-pattern noise" or FP noise for short. The FP noise is reduced by a specific calibration of image sensor 30 at the given operating conditions. In an exemplary embodiment, FP noise is reduced via a multi-level mapping of the fixed pattern noise wherein each pixel is corrected by a calibration table, e.g., a lookup table that has the correction values. This requires an individual calibration of each image sensor and calibration data storage in a calibration file. The mapping of the fixed pattern noise for a given image sensor is performed, for example, by imaging a pure white image (e.g., from an integrating sphere) and measuring the variation in the acquired raw digital image.

The other source of noise is shot noise, which is random noise. The shot noise is produced in electronic devices by the Poisson statistics associated with the movement of electrons. Shot noise also arises when converting photons to electrons via the photo-electric effect.

Some imaging applications, such as iris recognition, require a high-definition image sensor 30. To this end, in an exemplary embodiment, image sensor 30 is or includes a CMOS or CCD camera having an array of 3000×2208 pixels with a pixel size of 3.5 µm. The full well capacity is reduced to 21,000 electrons for a CMOS camera at this small pixel size, and the associated minimum of shot noise is about 43.2 dB at the saturation level.

An exemplary embodiment of system 10 has reduced noise so that the MTF quality is improved, which leads to improved images. The random nature of the shot noise is such that averaging N captured images is the only available approach to reducing the noise (i. e., improving the SNR). The noise decreases (i. e., the SNR increases) in proportion to $N^{1/2}$. This averaging process can be applied to raw images as well as to processed (i. e., contrast-enhanced) images.

Averaging N captured images is a suitable noise reduction approach so long as the images being averaged are of a fixed object or scene. However, such averaging is problematic when the object moves. In an exemplary embodiment, the movement of object OB is tracked and accurately measured, and the averaging process for reducing noise is employed by accounting for and compensating for the objection motion prior to averaging the raw images.

In an exemplary embodiment, the image averaging process of the present disclosure uses a correlation function between the sequential images at a common region of interest. The relative two-dimensional image shifts are determined by the location of the correlation peak. The correlation function is processed in the Fourier domain to speed the calculation by using a fast-Fourier transform (FFT) algorithm. The correlation function provided is sampled at the same sampling intervals as the initial images. The detection of the correlation maximum is accurate to the size of one pixel.

An improvement of this measurement technique is to use a 3×3 kernel of pixels centered on the pixel associated with the maximum correlation peak. The sub-pixel location is determined by fitting to two-dimensional parabolic functions to establish a maximum. The (X,Y) image shift is then determined. The images are re-sampled at their shifted locations. If the decimal part of the measured (X,Y) shift is not equal to 0, a bi-linear interpolation is performed. It is also possible to use a Shannon interpolation as well because there is no signal in the image at frequencies higher than the Nyquist frequency. All the images are then summed after being re-sampled, taking in account the (X,Y) shift in the measured correlation.

Iris Image Processing

Figure 5A:
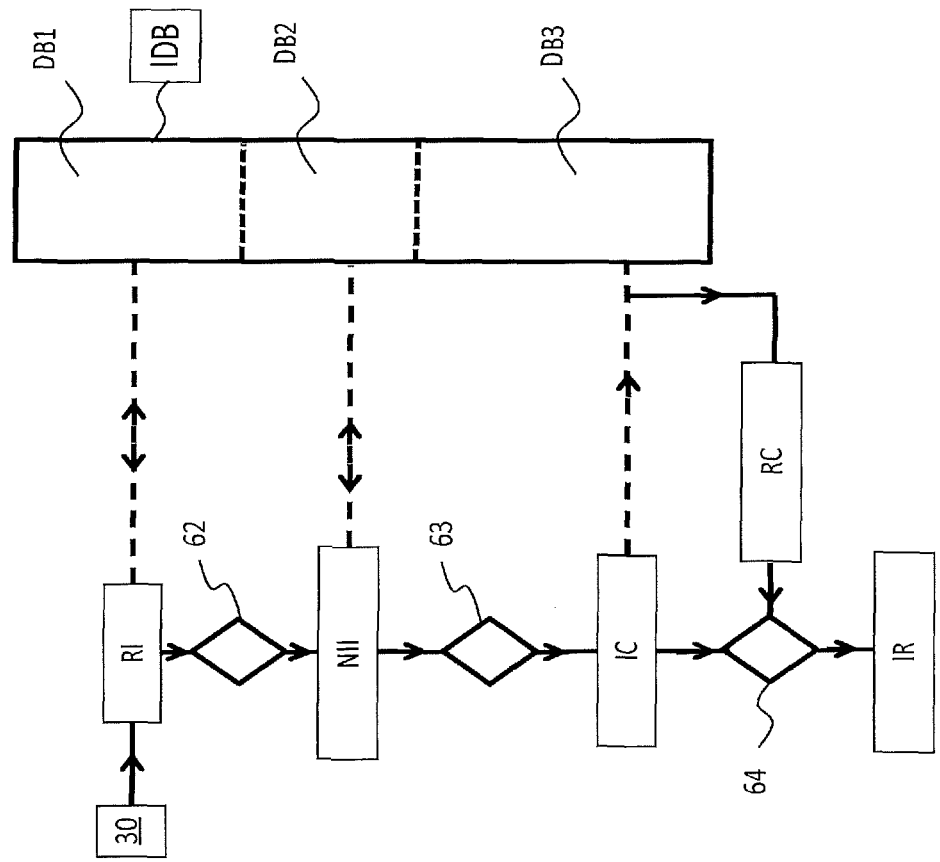
FIG. 5A depicts an exemplary general organogram of an iris image capture, processing, and comparison system in accordance with embodiments of the present disclosure.
Figure 5B:
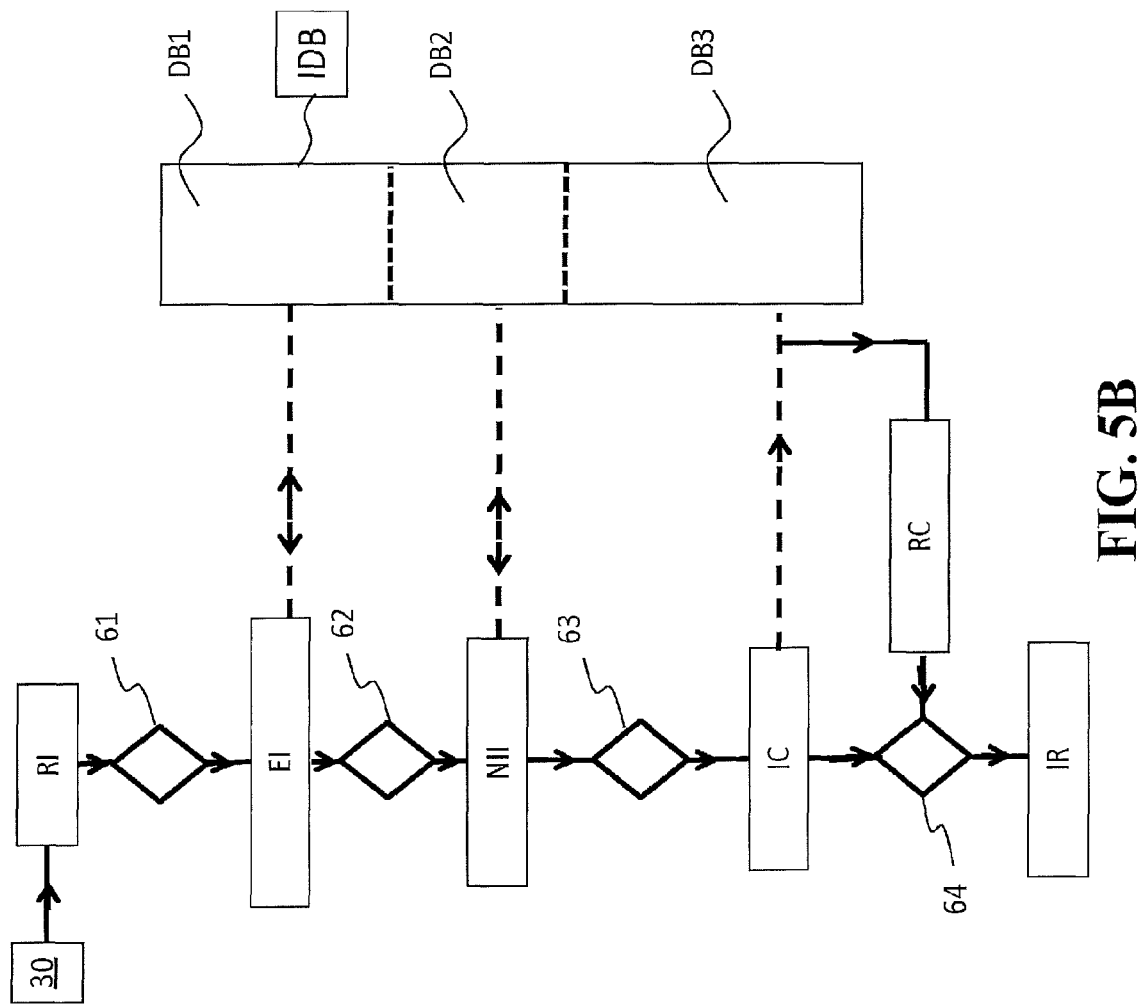
FIG. 5B depicts an exemplary general organogram of an iris image capture, processing, and comparison system including EDOF image capture and MTF enhancement of the raw image in accordance with embodiments of the present disclosure.

FIG. 5A depicts an exemplary general organogram of an iris image capture, processing, and comparison system including in accordance with embodiments of the present disclosure, while FIG. 5B depicts an exemplary general organogram of an iris image capture, processing, and comparison system including EDOF image capture and MTF enhancement in accordance with embodiments of the present disclosure.

In both FIGS. 5A and 5B, a raw image may be acquired by an image sensor 30. An exemplary lens and camera system may include settings that pass spatial frequencies from 0 to 10 lp/mm in the object space. A magnification relationship may exist between the object where an iris is located and the image space where the iris image is formed on an image capture device 30. It will be understood that focal length of a lens of the system 10 may be determined in any suitable manner, for example, to form the image according to the object distance, resulting in an appropriate pixel size and number of pixels, (e.g., for an image of an iris having a diameter of 10 mm, a range of 150-200 pixels per line).

As noted above, FIG. 5A generally depicts the operation of a system that does not include EDOF optics and processing, and thus, the raw image may be a high quality image that has MTF characteristics that do not require enhancement. However, in FIG. 5B the raw image may be captured with EDOF optics, which may provide advantages as far as the depth of field of image capture but may result in an image having reduced MTF characteristics. Thus, in FIG. 5B, at step 61 it may be desired to enhance the captured raw image captured by an EDOF system. Although it will be understood that the raw image may be enhanced in any suitable manner, in an embodiment the raw image may be enhanced using the MTF enhancement methods described above.

In some embodiments, the raw image of FIG. 5A or the MTF enhanced image of FIG. 5B may be stored for later use. Although an image may be stored in any suitable manner in any suitable medium, in an embodiment the iris image may be stored as part of an iris recognition enrollment process and may be stored in an iris enrollment database (e.g., database 90 of system 10, a remote database, and/or any other suitable database). In some embodiments the iris image may itself be used for iris recognition, such that the acquired iris image is compared to a stored iris image accessed from the database.

At step 62 of FIG. 5A or 5B, image processor 54 of system 10 may normalize the iris image. A typical captured iris image, such as an image complying with ISO INCITS 379 and ISO 19794-6, having a VGA size (640×480 pixels), may typically require 30 kB to 100 kB depending on the compression level of the image format (e.g., jpeg, jpeg2000, etc.) used for the image. For example, a raw 8 bit uncompressed image may require 307,200 bytes. As will be described below, for iris recognition applications the image may eventually be used to generate an iris code that is compared to an iris code corresponding to previously stored iris images of known users.

A raw iris image may include areas around the iris that do not provide useful information for generation of this iris code. Thus, at step 62 the iris image may be normalized.

Figure 3:
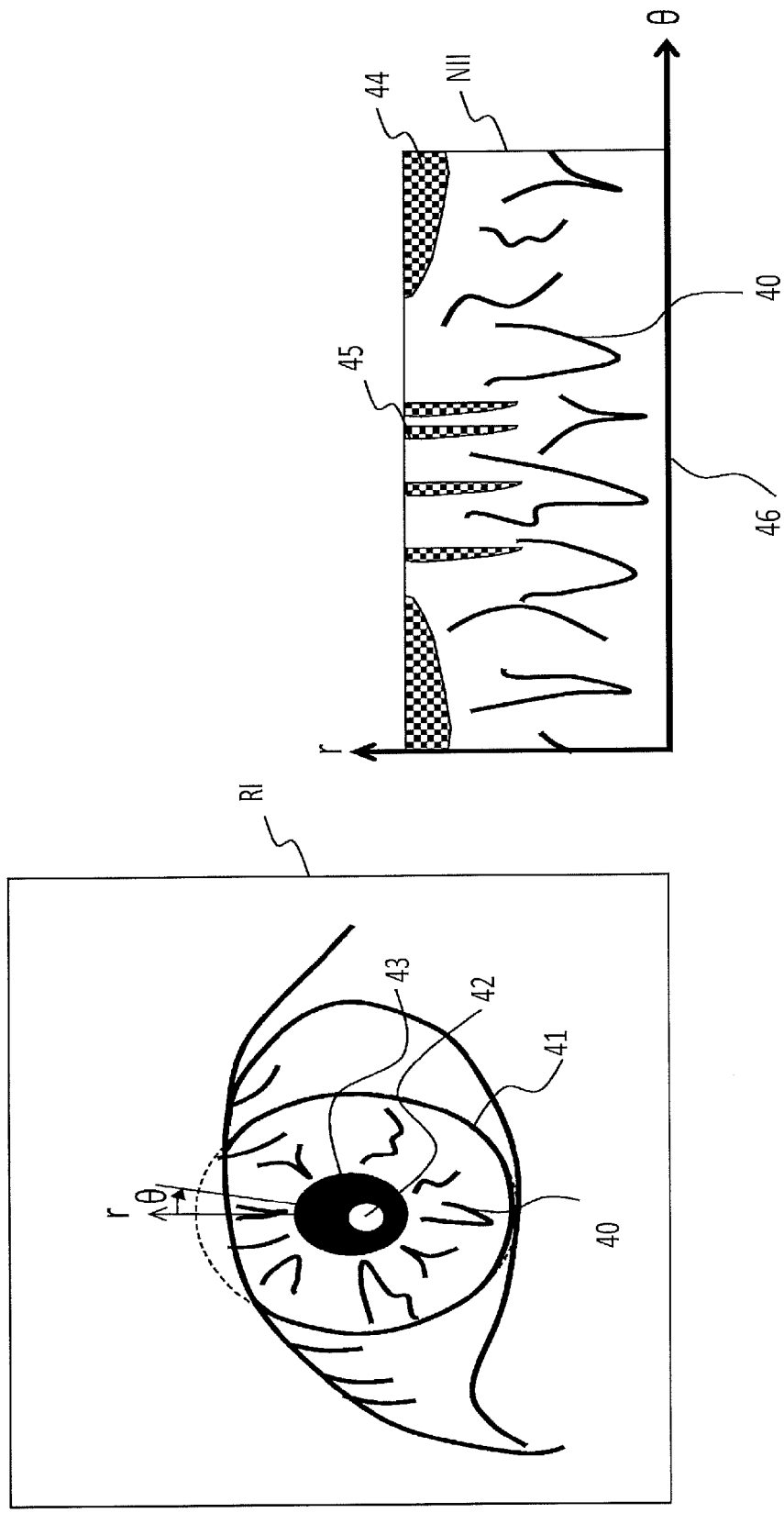
FIG. 3 depicts an exemplary geometrical representation of an iris image and normalized iris image in two-dimensional space in accordance with some embodiments of the present disclosure.

FIG. 3 depicts an exemplary geometrical representation of an iris image and normalized iris image in two-dimensional space in accordance with some embodiments of the present disclosure. Although iris image normalization may be performed in any suitable manner, in an embodiment the normalized image may be generated as a rectangular function using data from the iris region of interest representing no more than 8% of the whole captured image. In an embodiment, an estimation may be made based on a 200 pixels across the iris image on a 620×480 pixels area. For embodiments involving a high-resolution camera (e.g., a 5.5 MP or 10 MP camera), this ROI area can represent less than 1% of the acquired image, for example, of an image of the whole face of a user including the two eyes.

The normalized image may have a greatly reduced size in comparison to the iris image, e.g., less than 10 kB. During normalization, numerous areas not including relevant information for iris recognition may be removed. In an embodiment, the relevant iris image may be bounded by the internal pupil boundary 43 and the external iris boundary 41. Other aspects of the image within the iris boundary that are not relevant to iris recognition may also be removed from the image, including the sclera and the eyelid regions 44 and eyelashes 45. The result of the normalization process may be a normalized image 46, developed as a polar function of θ and radius r on the iris image of FIG. 3.

Returning to FIGS. 5A and 5B, in some embodiments, the normalized image may be stored for later use. Although the normalized image may be stored in any suitable manner and in any suitable medium, in an embodiment the normalized image may be stored as part of an iris recognition enrollment process and may be stored in an iris enrollment database (e.g., database 90 of system 10, a remote database, and/or any other suitable database). In some embodiments the normalized image may itself be used for iris recognition, such that the acquired and normalized image is compared to a stored normalized image accessed from the database.

At step 63, the normalized iris image may be encoded to generate an iris code for the iris of the acquired image. Iris recognition algorithms may build and use identification codes (iris codes) from captured images to be compared to stored iris codes or to generate the initial iris code during an enrollment process. A match between an iris code captured by a system 10 and a stored iris code from an image captured during a previous enrollment process may be determined based on a Hamming distance between the two iris codes, as described herein.

Although it will be understood that the iris code may be generated from the normalized image in any suitable manner, in an embodiment a mathematical transform may be used to generate the iris code. A common characteristic of these mathematical transforms may be to project the normalized iris image into a base or vector wavelet and generate a table of coefficients corresponding to the list of vectors, where each of these vectors has a typical print in the frequency domain whenever this transform is linear or not. Although it will be understood that any suitable mathematical transform may be used, in an embodiment the mathematical transform may be a Gabor transform or a Log Gabor transform. For example, the Gabor Transform (e.g., a discrete Gabor Transform) may be adapted to a numerical code to provide a list of vectors. The discrete Gabor Transform in 2D can be defined by:

$$G_{n_x,n_y,m_x,m_y}(u,v) = \sum_{m_x=0}^{M_x-1}\sum_{n_x=0}^{N_x-1}\sum_{m_y=0}^{M_y-1}\sum_{n_y=0}^{M_y-1} C_{m_x,n_x,m_y,n_y} \cdot g_{m_x,n_x,m_y,n_y}(u,v)$$

where:

$g_{m_x,n_x,m_y,n_y}$ are the discrete Gabor functions
$C_{m_x,n_x,m_y,n_y}$ are the coefficients for the identification code of the iris.

$$g_{m_x,n_x,m_y,n_y} = S(u-m_x N) \cdot S(v-m_y N) \cdot e^{i\Omega_x m_x u} \cdot e^{i\Omega_x m_x v}$$

where:

$m_x, n_x, m_y, n_y$ are the discrete integer index of Gabor functions

S ( ) represents the discrete Gabor functions u is the index position in the normalized image on the θ axis v is the index position in the normalized image on the r axis $m_x$ is the discrete order on the θ axis $m_y$ is the discrete order on the r axis $\Omega_x$ is the factor sampling on the θ axis, $\Omega x \le 27\pi/N_x$ $\Omega_y$ is the factor sampling on the r axis, $\Omega x \le 27\pi/N_y$ It will be understood that there may be variations of this representation in various bases of the function, where the coefficients are used to determine the identification code. The bases may be complete and orthogonal so that the numerical values of the coefficients have phase shift properties that result in a stable Hamming distance calculation when matching with an identification code from rotated iris.

In some embodiments, the iris code may be stored for later use. Although the iris code may be stored in any suitable manner and in any suitable medium, in an embodiment the iris code may be stored as part of an iris recognition enrollment process and may be stored in an iris enrollment database (e.g., database 90 of system 10, a remote database, and/or any other suitable database).

At step 64, the iris code associated with the captured iris image may be compared to iris codes stored in an iris enrollment database in order to determine if there is a match between iris codes. Although this matching process may be performed in any suitable manner, in an embodiment the iris code associated with the captured iris image may be compared to iris codes from the database, and a match determined based on the Hamming distance between the two iris codes.

FIG. 9A depicts an exemplary Hamming distance distribution for comparison of iris codes in accordance with some embodiments of the present disclosure. The greater the Hamming distance, the greater the difference between the two iris codes, and similarly, a smaller Hamming distance represents a lesser difference between the two iris codes. A self-matching image produces a Hamming distance of zero. However, the matching process is not perfect, but rather, matching between two independent snapshots of the same subject and the same eye will include some positive residual Hamming distance as a result of noise such as shot noise that is not correlated from one image to the next. Moreover, the fixed pattern noise has poor correlation because of the movement of the eye from one image to another when using same camera, and may be uncorrelated if the two images are produced on two different cameras. In addition, images from the same eye may produce some small variations on Hamming distance with dilatation of the pupil, a different eyelid aperture cropping a part of the iris, blur from motion, and illumination difference. As a result of these natural variations, a Hamming distance for a match is not zero.

Nonetheless, the difference between a match and a rejection is well defined. As depicted in FIG. 9A, an exemplary Hamming distance distribution may include two well-defined regions (id and di), such that a threshold (Th) can be selected that provides a very high probability of a correct match based on the Hamming distance being less than the threshold. If the Hamming distance is less than a threshold, a match is determined. A typical methodology for comparison of iris codes is described in U.S. Pat. No. 5,291,560, which is incorporated herein by reference.

MTF Enhancement of Normalized Iris Image

In some embodiments relating to processing of iris images, it may be possible to perform MTF enhancement on the normalized iris image rather than the raw iris image. This MTF enhancement may be represented as a direct convolution process operating as a sharpening process on the normalized iris image. Although it will be understood that MTF enhancement by convolution may be implemented in any suitable manner, including different numerical methods, in an embodiment this process may be applied using a kernel or applying a multiplicative 2D mask in the Fourier domain. This method may provide precision and reliability, as it respects the linear properties of the 2D convolution process on the whole image of an identified region of interest. In some implementations such as applications where the image must be processed and analyzed in real-time, this process may consume less computing resources than MTF enhancement of a raw image.

Figure 10:
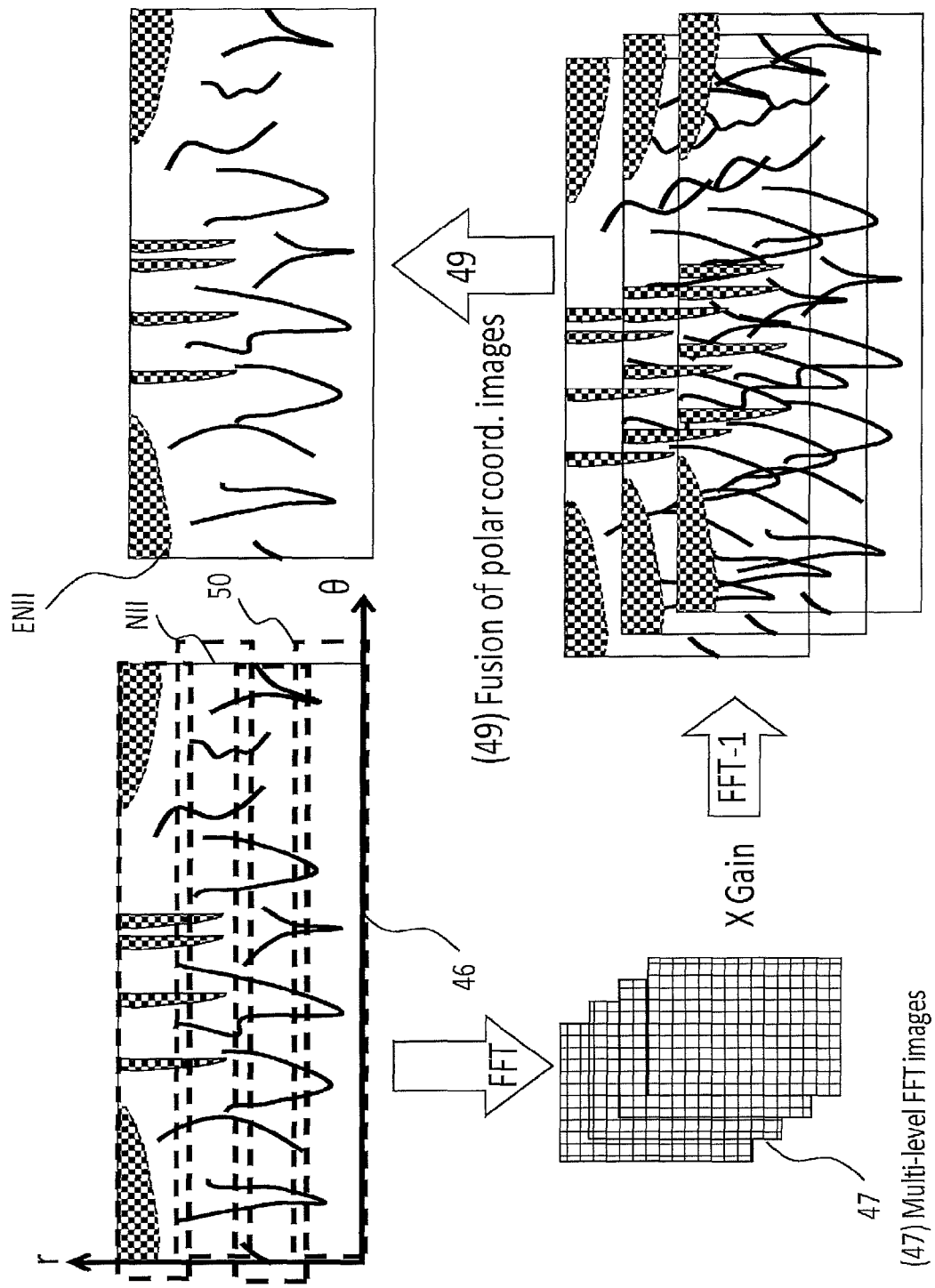
FIG. 10 depicts MTF enhancement of a normalized iris image in accordance with some embodiments of the present disclosure.

As described above, the normalized iris image is represented in polar coordinates in FIG. 3. FIG. 10 depicts MTF enhancement of a normalized iris image in accordance with some embodiments of the present disclosure. The normalized iris image is a function of θ and r. The θ coordinate is affected by a scale factor in the Cartesian frequency domain by this non-Euclidian transform. This scale factor in the spatial frequency domain is the direct inverse value, as follows:

F(θ,r) is the polar function of iris image in polar coordinates;
FT is the Fourier Transform; and
FT(F(θ,r))=Ĝ(U,V)
where U is subject to an inverse linear function of r, as any change in distance dθ is equivalent to a distance in object space of (r, dθ), where dθ is a small variation on θ

Thus, in the spatial frequency domain, the scaling factor between frequencies U in polar coordinates and frequencies f in object space is U=f/r. MTF enhancement of the normalized iris image in polar coordinates may therefore follow this progressive change of frequency scale on U.

In an embodiment, MTF enhancement of the normalized iris image in polar coordinates may be performed with a linear filter. Although it will be understood that any suitable filtering process may be used, in embodiments the filtering process may be performed with a kernel function or using convolution in the Fourier space.

In an embodiment, convolution in the Fourier space may involve multiplication with a gain function, having a numerical value depending on the frequency modulus. The equivalent Optical Transfer Function enhancement on original raw image is $$OTF'(u,v,d)=G(u,v,d)OTF(u,v,d)$$

Referring again to FIG. 10, in an embodiment the polar image may be split into several bands 50 at different (r) values, each band 50 corresponding to an average (r) value. As depicted in FIG. 10, these bands may partially overlap to prevent transferring edge artifacts in the final image fusion.

In an embodiment, the sequence of processing by FFT (Fast Fourier Transform) may involve 2 separate Nyquist frequencies on θ and r. If the band size is $N_θ \times N_r$, the Nyquist frequency on θ may be $N_θ/(4\pi r)$ and the Nyquist frequency on r may be $N_r/(2H)$, where H is the radial height of the band along r axis. The frequency scale on the FFT of the band may be calibrated according these Nyquist frequencies, such that each sample element of the FFT of the band has frequency coordinates u in the range $[-(N_θ-1)/(4\pi r)-1; N_θ/(4\pi r)]$ on the θ angular frequency, and v in range $[-(N_r-1)/(2H); N_r/(2H)]$ on the r radial frequency. Each sample may be a complex number describing phase and amplitude. The amplitude may multiplied by the gain function of MTF Gain(f) at the frequency f, with $f^2=u^2+v^2$.

The result may be to produce FFT images 47 for each of the bands, the images having MTF enhancement based on the by multiplication by Gain(f). The FFT images 47 may then be restored to polar coordinates by the inverse FFT transform, resulting in normalized images for each of the bands 50 having enhanced MTF properties. The MTF enhanced band images may then be merged to generate a fused image 49. The edges of the bands may contain some edge artifacts as a natural effect of convolution on the periodic band, in the same manner as would be produced by convolution repeating the same band function periodically. These edge artifacts may automatically be cropped from the final merged image, with each band cropped at its edges in overlapping areas. The result may be the MTF enhanced normalized iris image in polar coordinates.

In another embodiment, the MTF enhancement of the normalized iris image may be performed by a convolution using a kernel. In the same manner as described above, the normalized iris image may be split into bands.

The kernel of convolution on the θ axis is expanded in 1/r to represent correctly the same size from the original raw image in Cartesian coordinates. The merger of the convolved and separated bands may be performed in the same manner as described for the FFT method described above, meaning each of resulted image per band are recombined by same method at the end.

Iris Code Equalization

As described herein, in some embodiments in which an EDOF optical system is used, the raw image may be enhanced prior to or after normalization. In other embodiments, it may be desirable to avoid MTF enhancement of the EDOF raw image, for example, to reduce the processing time or the processing power necessary to perform the MTF enhancement. In an embodiment, system 10 may generate iris code equalization coefficients that facilitate the comparison of a stored iris code with an iris code generated from an EDOF image that has not been enhanced, whether or not the stored iris code was originally generated from a system 10 having an EDOF optical system.

Although equalization coefficients may be generated in any suitable manner, in an embodiment, the equalization coefficients may be generated based on the general characteristic of a wavelet as Gabor or Log-Gabor functions having a narrow spectrum. FIG. 4B depicts an exemplary plot of base wavelet functions for generating an iris code represented as a function of spatial frequency in accordance with some embodiments of the present disclosure. An analysis of the Fourier Transform of each of these elementary functions may demonstrate some typical narrow structures having a peak value and broadness related to the order values of $[n_x, n_y, m_x, m_y]$. It may be possible to determine equalization coefficients based on the narrow spectrum in the spatial frequency domain of each used base function of the identification code mathematical representation.

In an embodiment, an equalization (or amplification) ratio may be calculated based on the integration of the pondered average by integration over the spatial spectrum. The pondered average is an affecting weight value proportional to the amplitude of the spatial spectral density at each special frequency when calculating the average amplification coefficient. The MTF of the captured and normalized EDOF may have a mainly local variation of $E^t$ order, such that the variations of the $2^{nd}$ order are frequently negligible as a result of the low variation of MTF slope across the narrow size of the wavelet spectrum. In an embodiment, the equalization ratio may be determined based on the ratio between enhanced MTF values and raw MTF values at a considered special frequency peak, as depicted in FIG. 4C, which depicts an exemplary plot of the base wavelet functions for generating an iris code modulated by the gain MTF function, as a function of spatial frequency, in accordance with some embodiments of the present disclosure. The MTF properties for an EDOF system (e.g., the ratio between the raw and enhanced MTF for an EDOF system) may be system dependent and may be constants of the system.

FIG. 4D depicts an exemplary plot of a discrete representation of equalization coefficients associated with the modulated wavelet functions of FIG. 4C, as a function of spatial frequency, in accordance with some embodiments of the present disclosure. At each base function a multiplicative equalization coefficient related to the MTF Gain Function (MGF) may be determined. As described above, the MTF properties may be system dependent. The coefficients for a system may be determined in any suitable manner, e.g., based on an actual determined ratio for a system, based on estimated parameters, based on calculated parameters, any other suitable method, or any combination thereof.

Once the equalization coefficients are determined, they may be used in the matching process. Before equalization, the iris code numerical values are a table of numerical values $C_{m_x,n_x,m_y,n_y}$ After equalization, the iris code numerical values are $C'_{m_x,n_x,m_y,n_y}$ with $C'_{m_x,n_x,m_y,n_y} = A_{m_x,n_x,m_y,n_y} \cdot C_{m_x,n_x,m_y,n_y}$ where $A_{m_x,n_x,m_y,n_y}$ are the equalization or amplification coefficients on iris code.

Figures 8A, 8B:
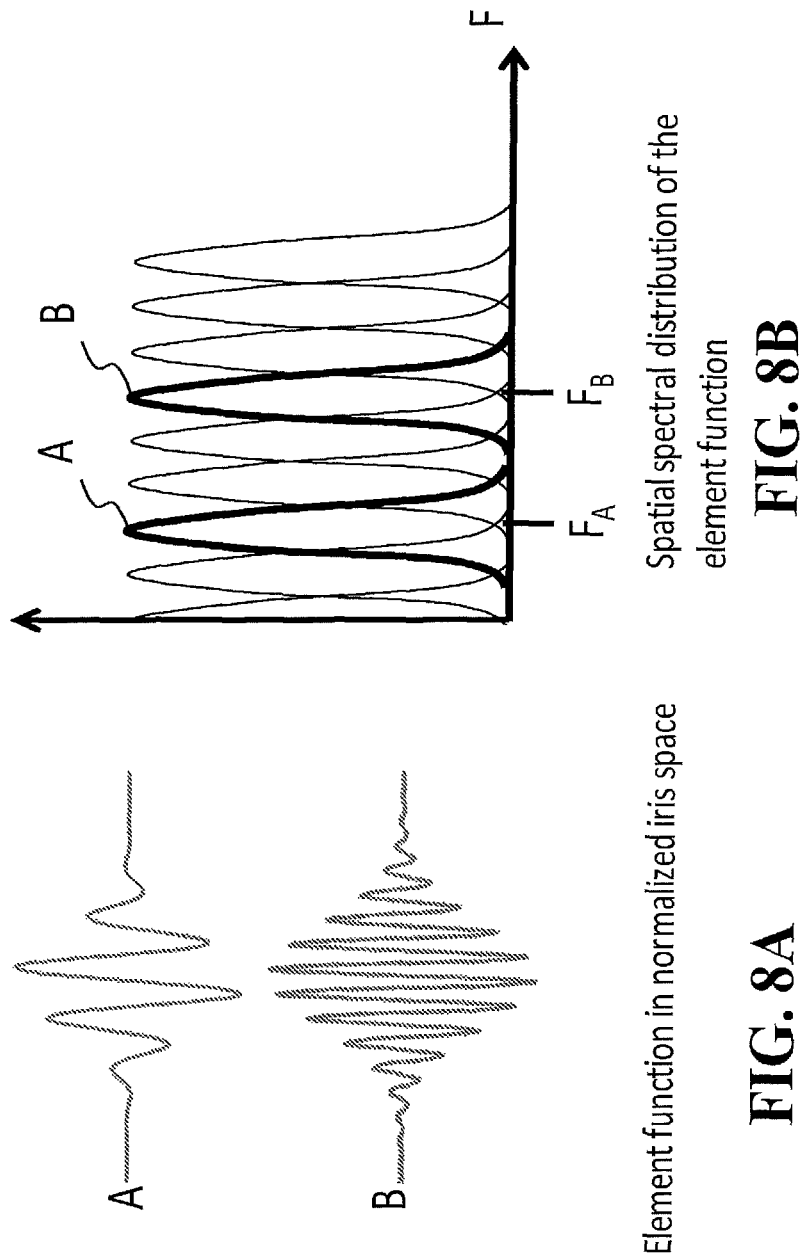
FIG. 8A depicts an exemplary wavelet function in normalized iris space in accordance with some embodiments of the present disclosure.
FIG. 8B depicts the spatial spectral distribution of the exemplary wavelet function of FIG. 8A in accordance with some embodiments of the present disclosure.

An exemplary embodiment for the use of equalization coefficients is illustrated by using the Discrete Gabor Transform as an example. However, it will be understood that this method may be applicable to any iris code generation algorithm as long as the base of the function is controlled and a limited spatial spectral bandwidth is applied for each base function. A simplified 1D representation of a Gabor wavelet base function is illustrated on FIG. 8A. Two typical Gabor functions wavelet cases A and B are represented on FIG. 8A extracted in 1 dimension for simplicity of the presentation. A and B may have different modulation frequencies, that are the frequency peak values in the frequency domain $F_A$ and $F_B$, e.g., as depicted in FIG. 8B. The equalization, gain or amplification factors to apply are determined by the defined gain function $A_{m_x,n_x,m_y,n_y} = \text{Gain}(f)$ with $f = F_A$ or $f = F_B$ accordingly, as described above. The equalization coefficients are multiplied by each respective coefficient of the iris code (based on by the designed MTF amplification ratio described and depicted with respect to FIG. 4A), and corresponding to the average or central peak spatial frequency of the spectral signature of the associated iris code function (e.g., as depicted and described with respect to FIG. 4D).

EDOF Iris Image Processing

Figure 7:
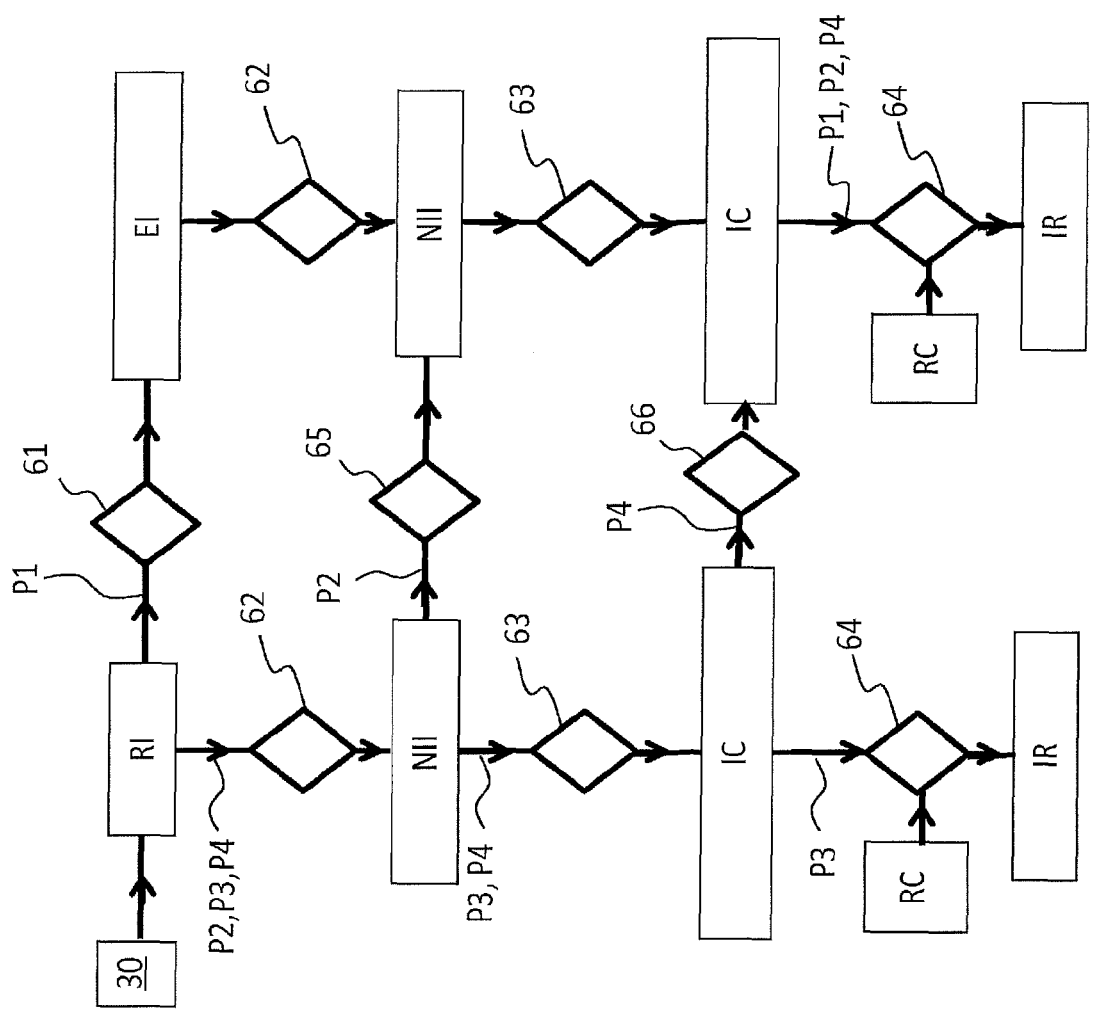
FIG. 7 depicts an exemplary organogram representing four paths P1-P4 depicting exemplary sequences for biometric identification from image acquisition to identification, in accordance with some embodiments of the present disclosure.

FIG. 7 depicts an exemplary organogram representing four paths P1-P4 depicting exemplary sequences for biometric identification from image acquisition to identification, in accordance with some embodiments of the present disclosure. In the exemplary embodiment of FIG. 7, the raw image captured by image sensor 30 has been captured with an EDOF optical system, having extended of field and MTF characteristics as described herein. FIG. 7 depicts four alternative processing paths for the EDOF raw image. The first path P1 corresponds to the path of FIG. 5B, and includes the same steps 61-64 for enhancing the EDOF raw image (step 61), normalizing the enhanced image (step 62), generating an iris code for the normalized enhanced image (step 63), and performing a match based on the iris code for the normalized enhanced image (step 64). Path P2 differs from path P1 in that MTF enhancement is performed on the normalized image at step 65, not on the raw image at step 61. Path P3 omits MTF enhancement, but performs the remaining steps, as will be described in more detail below. Finally, path P4 omits MTF enhancement, but adds an additional step of equalization (step 66), as will be described in more detail below.

Referring to path P2, in an embodiment the EDOF raw image may be normalized at step 62. MTF enhancement (e.g., convolution as described herein) may then be performed after normalization of the EDOF raw image at step 65 of P2, such that MTF enhancement occurs in the space of the normalized image. Performing MTF enhancement on the normalized image may require significantly less processing power than performing this processing on the full EDOF raw image as required at step 61 of path P1. In an embodiment, the process of applying the convolution method on the reduced space results in a new rectangular table of data having less than 10% of volume of data of the raw image source. Path P2 may be applicable in iris recognition applications where algorithms generate the rectangular normalized image extracted from annular area of iris, e.g., as described herein.

The geometrical transformation from a polar representation to a rectangular representation may produce a non-uniform stitch on the image, such that the output sampling pitch on an angle 0 increases with the radial distance. The MTF enhancement may be performed on the normalized image based on an approximation, which may be determined by considering the average pitch of the image. The resulting enhanced and normalized image of path P2 may have similar properties to the enhanced and normalized image of path P1, but may require significantly less processing overhead. Processing may then continue to iris code generation (step 63) and matching (step 64) as described above.

Referring to path P3, in an embodiment the EDOF raw image may be processed without MTF enhancement. In an embodiment, the depth of field enhancement produced by the spherical aberration of the EDOF optical system may remain active by preventing zeroes and contrast inversion of the optical MTF within the extended depth of field. The spherical aberration may reduce the amplitude of the signal and affect the ratio of amplitude between low and higher spatial frequencies, for example, as shown on FIGS. 6A and 6B. This ratio variation may be progressive with the spatial frequency without introducing any phase shift in the spatial frequency or Fourier domain between frequencies. Without the introduction of the phase shift, this may limit the production of artifacts from the image space that could affect directly the matching process when calculating the Hamming distance (e.g., by increasing randomly the Hamming distance). As a result, there is a low dispersion on the Hamming distance, which may limit the error rate, even without MTF enhancement. In an embodiment, the error rate may be reduced by using functions for the Hamming distance calculation that have a dominant weight on low spatial frequencies ("LSF"), e.g., the frequencies depicted in FIG. 6B. The dispersion effect will increase, however, to the degree that the medium spatial frequency ("MSF") and high spatial frequency ("HSF") are used. On the normalized image space, this regular and continuous increase of MTF ratio between enhanced and non-enhanced MTF may prevent generation of artifacts that could affect the Hamming distance when matching.

In an embodiment, the imaging system used for enrollment in the iris database may have similar optical characteristics (e.g., an EDOF optical system having spherical aberration). Using a similar system for enrollment (with or without MTF enhancement) and capture may result in a lower error rate. Whatever system is used for enrollment, path P3 may maintain compatibility with existing iris databases (e.g., ISO INCITS 379 and ISO 19794-6).

Referring to path P4, in an embodiment the EDOF raw image may be processed without MTF enhancement, but with an added equalization step 66. As described above, the equalization process may result in an improvement in the comparison of an iris code from an image that has not undergone MTF enhancement with an image from an iris enrollment database, resulting in a reduction of the Hamming distance that would exist without equalization. The raw EDOF iris image is normalized at step 62, an iris code is generated for the normalized image at step 63, equalization is performed at step 66, and the iris codes are compared at step 64.

FIG. 9B depicts exemplary Hamming distance distributions for comparison of iris codes based on different iris enrollment and capture procedures in accordance with some embodiments of the present disclosure. The plot Eq1 may represent the statistical histogram of the Hamming distance produced by matching the same eye where the captured and stored image of the same iris were both produced with a lens lacking spherical aberration, where one image was captured with a lens lacking spherical aberration and the other image was captured by a lens having controlled spherical aberration and a system employing an enhanced MTF technique, or where both images were produced by a lens having controlled spherical aberration and a system employing an enhanced MTF technique. The plot Eq2 may represent the statistical histogram of the Hamming distance produced by matching the same eye with lenses both having controlled amount of spherical aberration but without MTF enhancement. Because the MTF is lower by adding spherical aberration, the signal to noise ratio may increase while no information is lost. The effect of relatively higher noise slightly enlarges the Hamming distance dispersion and produces a slight increase of error probability. The plot Eq3 may represent the statistical histogram of the Hamming distance produced by matching the same eye where one of the two images is produced with a lens lacking spherical aberration or with a lens having controlled spherical aberration and a system having MTF enhancement, and the other image is produced with a lens having controlled spherical aberration and no MTF enhancement. Because the MTF ratio of the two images is not constant with the spatial frequency, this may produce some slight additional distortion between the coefficients of the iris code and thus enlarge the dispersion of Hamming distance.

The plots Df1, Df2 and Df3 are respectively the Hamming distances of matching different eyes from different subjects, with capture and enrollment systems configured as described above for Eq1, Eq2, and Eq3. Although not depicted in FIG. 9B, the statistical plots Eq2, Eq3, Df2, and Df3 may have dispersion characteristics that are closer to Eq1 and Df1 when the identification algorithms are using mainly information from low spatial frequencies, based on the MTF characteristics for low spatial frequencies as described above with respect to FIG. 6B. In this manner, the relative amplitude of the coding coefficients is affected while maintaining strong correlation between the coefficients, such that the calculation of the Hamming distance is not significantly affected. As depicted in FIG. 9B, a threshold distance Th may be selected that results in a highly accurate determination of iris code matches, whichever optical system or processing path is used as described above.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method of processing an extended depth-of-field (EDOF) image of an iris at an imaging wavelength $\lambda_{IM}$, comprising:
    capturing a raw image of the iris, wherein the raw image has a reduced modulation transfer function (MTF) based on an optical system having an amount of spherical aberration (SA) of $0.2\lambda_{IM} \leq SA \leq 2\lambda_{IM}$;
    normalizing the raw image;
    performing an MTF enhancement of the normalized raw image in polar coordinates to generate a MTF enhanced image; and
    generating an iris code from the MTF enhanced image.

2. The method of claim 1, further comprising storing the MTF enhanced image in an iris enrollment database.

3. The method of claim 1, further comprising storing the raw image in an iris enrollment database.

4. The method of claim 1, further comprising storing the normalized raw image in an iris enrollment database.

5. The method of claim 1, further comprising storing the iris code in an iris enrollment database.

6. The method of claim 1, further comprising comparing the iris code to one or more known iris codes.

7. The method of claim 6, wherein the known iris codes were originally obtained by an optical system having no enhanced depth of field function.

8. The method of claim 6, wherein the known iris codes were originally obtained by an optical system having an enhanced depth of field function without MTF enhancement.

9. The method of claim 1, wherein the optical system comprises a single lens system.

10. The method of claim 9, wherein an aperture stop for the optical system is located at a position that minimizes comatic aberration.

11. The method of claim 9, wherein the single lens comprises glass or plastic.

12. The method of claim 9, wherein the single lens comprises a rotationally symmetric optical component.

13. The method of claim 9, wherein the single lens comprises a spherical refractive surface.

14. The method of claim 1, wherein normalizing the raw image comprises removing portions of the raw image that lack information about the iris.

15. The method of claim 14, wherein removing portions of the raw image that lack information about the iris comprises removing portions of the raw image that are not within the external iris boundary and outside of the internal pupil boundary.

16. The method of claim 1, wherein the normalized raw image requires less than 10% of a number of bytes of data that are required for the raw image.

17. The method of claim 1, wherein the normalized raw image requires less than 5% of a number of bytes of data that are required for the raw image.

18. A system for processing an extended depth-of-field (EDOF) image of an iris at an imaging wavelength $\lambda_{IM}$, comprising:
    an optical system having an amount of spherical aberration (SA) of $0.2\lambda_{IM} \leq SA \leq 2\lambda_{IM}$, the optical system being configured to form on an image sensor a raw image having reduced a modulation transfer function (MTF) based on the spherical aberration;
    a controller electrically connected to the image sensor, wherein the controller is configured to capture a raw image of the iris from the optical system, normalize the raw image, perform an MTF enhancement of the normalized raw image in polar coordinates to generate a MTF enhanced image, and generate an iris code from the MTF enhanced image.

19. The system of claim 18, wherein the controller is further configured to store the MTF enhanced image in an iris enrollment database.

20. The system of claim 18, wherein the controller is further configured to store the raw image in an iris enrollment database.

21. The system of claim 18, wherein the controller is further configured to store the normalized raw image in an iris enrollment database.

22. The system of claim 18, wherein the controller is further configured to store the iris code in an iris enrollment database.

23. The system of claim 18, wherein the controller is further configured to compare the iris code to one or more known iris codes.

24. The system of claim 23, wherein the known iris codes were originally obtained by an optical system having no enhanced depth of field function.

25. The system of claim 23, wherein the known iris codes were originally obtained by an optical system having an enhanced depth of field function without MTF enhancement.

26. The system of claim 18, wherein the optical system comprises a single lens system.

27. The system of claim 26, wherein an aperture stop for the optical system is located at a position that minimizes comatic aberration.

28. The system of claim 26, wherein the single lens comprises glass or plastic.

29. The system of claim 26, wherein the single lens comprises a rotationally symmetric optical component.

30. The system of claim 26, wherein the single lens comprises a spherical refractive surface.

31. The system of claim 18, wherein the controller is configured to remove portions of the raw image that lack information about the iris to normalize the raw image.

32. The system of claim 31, wherein the controller is configured to remove portions of the raw image that are not within the external iris boundary and outside of the internal pupil boundary to remove portions of the raw image that lack information about the iris.

33. The system of claim 18, wherein the normalized raw image requires less than 10% of a number of bytes of data that are required for the raw image.

34. The system of claim 18, wherein the normalized raw image requires less than 5% of a number of bytes of data that are required for the raw image.

\* \* \* \* \*